W. R. RITCHIE & T. N. KELLETT.
OIL WELL PUMP.
APPLICATION FILED OCT. 30, 1907.
925,510.
Patented June 22, 1909.
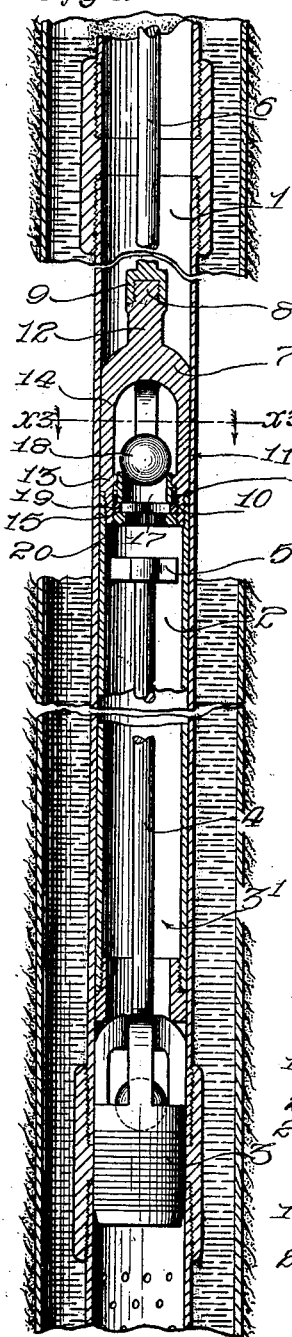
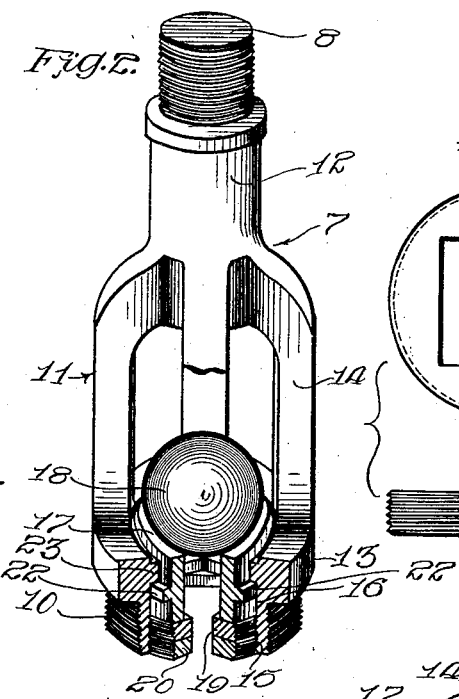
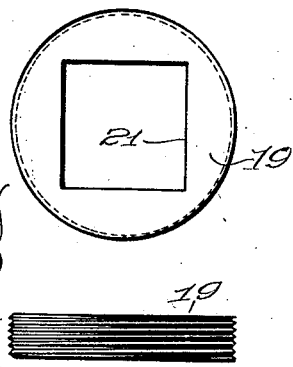
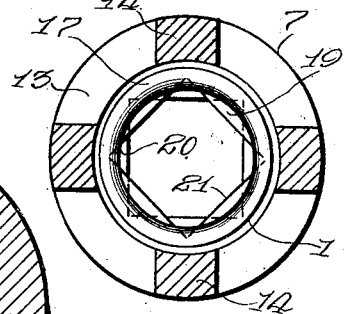
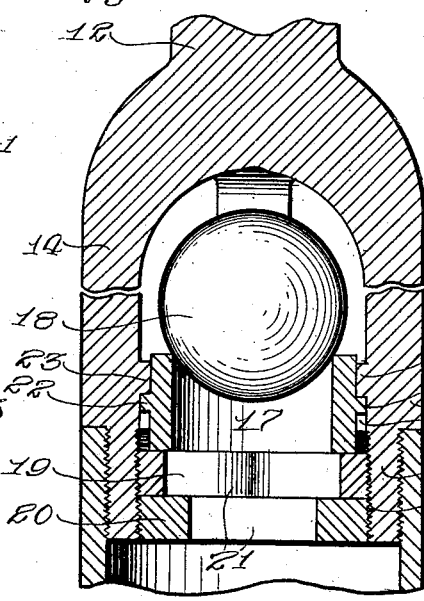
Inventors
William Rufus Ritchie
Thomas Neal Kellett
Witnesses:

UNITED STATES PATENT OFFICE.

WILLIAM RUFUS RITCHIE AND THOMAS N. KELLETT, OF LOS ANGELES, CALIFORNIA.

OIL-WELL PUMP.

No. 925,510.　　　　Specification of Letters Patent.　　　　Patented June 22, 1909.

Application filed October 30, 1907. Serial No. 399,960.

*To all whom it may concern:*

Be it known that we, WILLIAM RUFUS RITCHIE and THOMAS N. KELLETT, both citizens of the United States, residing at Los Angeles, in the county of Los Angeles and State of California, have invented a new and useful Improvement in Oil-Well Pumps, of which the following is a specification.

This invention relates to that class of pumps in which a plunger body is surmounted with a cage and a ball-seat, and a ball in said cage to close said seat to afford suction as the plunger rises, and to allow the oil to pass as the plunger descends, said pump being provided also with a standing valve below the plunger to retain the oil on the down-stroke of the piston.

It is at present customary to provide a connection between the standing-valve and the plunger, known as the Garbutt attachment, for the purpose of pulling the standing-valve out when the plunger is withdrawn from the well for the purpose of removing sand or for making repairs.

Heretofore it has been a common occurrence for the cage to become unscrewed from the bushing which connects it with the plunger body, and in such case it proves to be very difficult to fish out the plunger body by any of the means at present known, on account of the ball of the valve, or the ball-seat, or both, interfering with the insertion of the fishing-tool into a position where it can grapple the plunger body or bushing with sufficient force to withdraw it.

In case the cage becomes unscrewed from the usual bushing by which it has been attached to the plunger body, thereupon the operation of the sucker-rod causes the threads of the cage to pound upon the threads of the bushing, thereby battering the same so that it becomes impossible to again screw the cage into place or to screw the fishing-tool onto the bushing for the purpose of withdrawing the plunger body.

Owing to the conditions above detailed it frequently becomes necessary to pull the tubing in order to withdraw the plunger body and to put the pump again into working order.

An object of this invention is to so construct an oil-well pump as to avoid the above mentioned difficulties heretofore experienced. This we do by providing the pump with a plunger body of sufficient length to project somewhat above the top of the Garbutt nut when the plunger is fully depressed, and by providing the cage with a ball-seat carried thereby independently of the bushing or any means that is detachable from the cage by contact with the plunger body.

The invention may be embodied in various forms, and we shall show herein that form we at present deem most desirable.

The accompanying drawings illustrate the invention.

Figure 1 is a broken sectional view of an oil-pump provided with this invention and the Garbutt attachment, in position at the bottom of a well, with the plunger fully depressed onto the standing valve. Fig. 2 is an enlarged broken view of our newly-invented cage with ball and seat connected therewith, said cage being detached from the plunger body. Fig. 3 is a sectional plan on line $x^3$—$x^3$, Fig. 1, omitting the ball. Fig. 4 is a fragmental axial section of the cage connected with the plunger body. The ball valve, valve-seat and lock-nuts are shown in position. Fig. 5 shows one of the lock nuts in plan and in elevation.

1 is the well-casing, 2 the plunger body of the pump, 3 the standing valve and 3' the Garbutt attachment, 4 the connection of said attachment extending into the plunger body and provided with a Garbutt nut or butterfly 5.

6 is a sucker-rod, and 7 a cage connecting the sucker-rod with the plunger body by means of a screw-threaded pin 8, to fit the socket 9 of the sucker-rod, and the internally and externally threaded reduced portion 10 which screws into the top of the plunger body. Said reduced portion 10 is connected with the pin by the frame 11 of the cage 7 which comprises the neck 12, the base-ring 13, and the pillars 14.

The portion 10 of the cage is internally screw-threaded as at 15, and the base of said cage is provided with a shouldered recess 16 to receive the valve-seat 17 which carries the ball valve 18, and is held in said recess by suitable means, as the internal lock-nuts 19, 20, which are screwed into the screw-threaded portion 10 from below, thus to hold the valve-seat positively locked in the cage. Said nuts are preferably provided with angularities, as indicated at 21, to receive a tool by which they may be screwed into place with the intermediate annular shoulder 22 of the valve-seat against the shoulder 23 of the cage. By the construction set forth the only disconnections of parts which may occur while the sucker is in the well, are, first,— the unscrewing of the sucker-rod from the cage-pin; and second,—the unscrewing of the cage from the plunger body. In the first instance it is a simple matter to grapple the cage by a fishing-tool for the purpose of withdrawing it together with the plunger body, and in the second instance it is a simple matter to grapple the plunger body by a fishing-tool, thereby withdrawing it and the Garbutt attachment.

By reducing the lower end of the cage as at 10 and externally threading the same to screw into the plunger body or shell 2, it is made possible to fasten the valve seat 17 in such a way that there is no contact of the same, or its fastening, with any part which might afford friction by which it might become loosened from its seat. The lock nuts when tightly screwed home against the valve seat absolutely do away with any liability that the valve seat may become loosened.

In this invention an important feature is the construction of the cage which consists of an integral element or part comprising the pin 8, neck 12, an internally-shouldered base-ring 13, pillars 14, and reduced internally and externally threaded portion 10 extending down below the shoulders formed by the base-ring, the same being of greater internal diameter than the internal shoulder and of less external diameter than the base-ring, thereby affording means to secure the support for the ball-valve 18 and also to screw into the top of the plunger-body. By this construction, when the ball-seat is in place and secured by the internal nuts 19 and 20, the cage is ready for connection with the plunger-body, and its attachment to or detachment from said plunger-body can have no effect whatever upon the cage to release the ball.

We claim:—

1. In an oil-well-pump, a cage comprising a screw-threaded pin, a neck extending downwardly from the pin, pillars extending downwardly from the neck, a base-ring connecting the lower ends of the pillars, a reduced internally and externally threaded portion extending downwardly from the base-ring, an internal shoulder in the base-ring of less diameter than the internal screw-thread, a plunger-body connected to the external screw-thread, a valve-seat inserted upwardly against the internal shoulder, and lock-nuts operating in the internal screw-thread to hold the valve-seat.

2. A valve-cage provided with an externally and internally screw-threaded reduced portion for connection with a pump plunger body and provided with an internal shouldered recess, a shouldered valve-seat in said recess for the valve of said cage, and nuts provided with angularities and contained within and screwed into said cage to secure the valve-seat in said recess.

3. An oil-well cage provided with a threaded portion to screw into the plunger of an oil-well-pump and being internally screw-threaded and provided with an internal recess, a valve-seat in said recess, and a nut screwed into said internal screw of the cage to hold the valve-seat in place.

4. An oil-well-cage provided with a threaded portion to screw into the plunger body of an oil-well pump and being internally screw-threaded and provided with an internal recess, a valve-seat in said recess, and lock-nuts screwed into said internal screw of the cage to hold the valve-seat in place.

5. In an oil-well-pump, a standing-valve, a pump-plunger body, a Garbutt connection between the pump-plunger body and the standing-valve, said plunger-body being longer than the Garbutt connection so that the lower end of the plunger-body will strike the standing-valve before the Garbutt nut will strike the pump-cage, and a cage comprising an internally shouldered base-ring, a reduced internally and externally threaded portion extending from the base-ring and screw-seated in the upper end of the plunger-body, a valve-seat inserted upwardly against the shoulder of the base-ring, lock-nuts for holding the valve-seat in place, pillars extending upwardly from the base-ring, a neck extending upwardly from the pillars, and a screw-threaded pin extending upwardly from the neck.

6. An oil-well-pump provided with a standing valve and a Garbutt attachment and a cage having a shouldered recess and a downwardly-projecting externally-threaded reduced portion integral with the base-ring and pillars of the cage, a shouldered valve seat in said recess, a valve on said valve-seat and lock-nuts in said recess below the valve seat to hold such valve seat in place with said shoulders in engagement with each other.

7. An oil-well-pump provided with a cage portion comprising an integral piece formed with a pin, a neck, pillars, a base ring, and a downwardly-extending externally and internally threaded reduced portion, a ball in the cage, a valve-seat in the cage, and means screwed into said downwardly-extending part to retain the valve-seat.

8. An oil-well-pump-cage comprising a screw-threaded pin, a neck extending downwardly from the pin, pillars extending downwardly from the neck, a base-ring connecting the lower ends of the pillars and having an internal shoulder, a valve-seat inserted upwardly against the shoulder, a reduced internally and externally threaded portion extending downwardly below the shoulder, and lock-nuts for holding the valve-seat in place.

In testimony whereof, we have hereunto set our hands at Los Angeles, California, this 23d day of October, 1907.

WILLIAM RUFUS RITCHIE.
THOS. N. KELLETT.

In presence of—
JAMES R. TOWNSEND,
M. BEULAH TOWNSEND.